United States Patent
Sakurai

(10) Patent No.: US 11,908,157 B2
(45) Date of Patent: Feb. 20, 2024

(54) IMAGE PROCESSING DEVICE, IMAGE PROCESSING METHOD, AND RECORDING MEDIUM IN WHICH PROGRAM IS STORED

(71) Applicant: NEC Corporation, Tokyo (JP)

(72) Inventor: Kazuyuki Sakurai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 238 days.

(21) Appl. No.: 17/437,476

(22) PCT Filed: Mar. 9, 2020

(86) PCT No.: PCT/JP2020/009917
§ 371 (c)(1),
(2) Date: Sep. 9, 2021

(87) PCT Pub. No.: WO2020/195732
PCT Pub. Date: Oct. 1, 2020

(65) Prior Publication Data
US 2022/0156959 A1  May 19, 2022

(30) Foreign Application Priority Data
Mar. 22, 2019 (JP) ................. 2019-055164

(51) Int. Cl.
G06K 9/00 (2022.01)
G06T 7/70 (2017.01)
G06T 7/215 (2017.01)

(52) U.S. Cl.
CPC ............. *G06T 7/70* (2017.01); *G06T 7/215* (2017.01); *G06T 2207/30201* (2013.01)

(58) Field of Classification Search
CPC ..................................... G06V 40/45
See application file for complete search history.

(56) References Cited

U.S. PATENT DOCUMENTS

| | | | |
|---|---|---|---|
| 2014/0015930 A1* | 1/2014 | Sengupta | G06V 20/52 348/46 |
| 2014/0347479 A1* | 11/2014 | Givon | G06V 40/103 382/116 |
| 2016/0335511 A1* | 11/2016 | Macdonald | G06V 40/45 |

(Continued)

FOREIGN PATENT DOCUMENTS

| | | |
|---|---|---|
| JP | 5061563 B2 | 10/2012 |
| JP | 2014-006700 A | 1/2014 |
| JP | 2018-045435 A | 3/2018 |

OTHER PUBLICATIONS

International Search Report for PCT Application No. PCT/JP2020/009917, dated Apr. 14, 2020.

(Continued)

*Primary Examiner* — Hadi Akhavannik

(57) ABSTRACT

An image processing device is provided with: a movement detection unit—for detecting, from time-series images, a first feature relating to the first movement of a head portion of a person and a second feature relating to the second movement of a body portion, which is a part of the person other than the head portion; and an index value calculation unit for calculating an index value which indicates the degree of consistency between the first feature relating to the first movement of the head portion of the person and the second feature relating to the second movement of the body portion of the person.

8 Claims, 8 Drawing Sheets

(56) References Cited

U.S. PATENT DOCUMENTS

| | | | | |
|---|---|---|---|---|
| 2016/0358332 | A1* | 12/2016 | Watanabe | A61B 5/725 |
| 2017/0180348 | A1* | 6/2017 | Piccolotto | G06F 21/32 |
| 2018/0075295 | A1 | 3/2018 | Yamaguchi et al. | |
| 2018/0211096 | A1* | 7/2018 | Cao | G06V 40/171 |
| 2019/0147676 | A1* | 5/2019 | Madzhunkov | G06F 21/32 |
| | | | | 340/5.2 |
| 2019/0213816 | A1* | 7/2019 | Grigorov | H04N 23/11 |
| 2022/0156959 | A1* | 5/2022 | Sakurai | G06V 40/45 |

OTHER PUBLICATIONS

English translation of Written opinion for PCT Application No. PCT/JP2020/009917, dated Apr. 14, 2020.

Koichi Ito et al., "A Liveness Detection Method Using Convolutional Neural Network" (IEICE Transactions A), Dec. 1, 2017, vol. J100-A, No. 12, pp. 455-464.

Shen Linlin, "Gabor Features and Support Vector Machine for Face Identification", Bio-medical fuzzy and human sciences, the official journal of the Biomedical Fuzzy Systems Association 14(1), pp. 61-66, Jan. 8, 2009.

Junichi Nita et al., "Pointing Gesture Recognition using Timing Structure of the Movements of Head & Arms and its Evaluation", IEICE Technical Report, Jan. 13, 2011, vol. 110, No. 382, pp. 199-204, ISSN 0913-5685.

Extended European Search Report for EP Application No. 20777945.5 dated on Apr. 8, 2022.

Feng Litong et al: "Integration of image quality and motion cues for face anti-spoofing: A neural network approach", Journal of Visual Communication and Image Representation, Academic Press, Inc, US, vol. 38, Apr. 1, 2016, pp. 451-460.

Komulainen Jukka et al: "Context based face anti-spoofing", 2013 IEEE Sixth International Conference on Biometrics: Theory, Applications and Systems (BTAS), IEEE, Sep. 29, 2013, pp. 1-8.

* cited by examiner

IMAGE PROCESSING DEVICE, IMAGE PROCESSING METHOD, AND RECORDING MEDIUM IN WHICH PROGRAM IS STORED

This application is a National Stage Entry of PCT/JP2020/009917 filed on Mar. 9, 2020, which claims priority from Japanese Patent Application 2019-055164 filed on Mar. 22, 2019, the contents of all of which are incorporated herein by reference, in their entirety.

TECHNICAL FIELD

The present disclosure relates to an image processing apparatus, an image processing method, and a program, and, for example, relates to an image processing apparatus that executes face authentication of a person.

BACKGROUND ART

In entrance/exit management at airports, stadiums, and the like, face authentication is used for security or identity verification. An action of attempting to break the face authentication is performed using a face image of another person (for example, a print of a photograph, or the like). Such an action is an example of spoofing that is an action of pretending to be another person.

An example of spoofing will be described in detail with reference to FIG. 8. As illustrated in FIG. 8, a person conceals one's face by raising a print of a photograph, a display, or the like in front of the one's face. A face image of another person is displayed on the print or display. The person illegally passes the face authentication by using the face image of another person displayed on the print or display. PTL 1 and NPL 1 disclose related technologies for detecting spoofing as described above.

In the related technology described in PTL 1, a face of a person is imaged as a moving image, and a blink of the person is detected on the basis of a difference between time-series images. Then, when the blink of the person has never been detected within a predetermined period, it is determined that the face of the person is not authentic. The fact that a face of a human is not authentic means that the face of the human is not the face of the person oneself. In this way, in the related technology described in PTL 1, spoofing is determined.

In the related technology described in NPL 1, spoofing is determined by using machine learning. Specifically, features of an authentic face are learned using a convolutional neural network. Then, a discriminator is generated for discriminating between a face image appearing on a print or a display and the authentic face. It is determined whether the face of the person is fake or authentic by using the learned discriminator.

CITATION LIST

Patent Literature

[PTL 1] JP 5061563 B2

Non Patent Literature

[NPL 1] Koichi I to et al., "A Liveness Detection Method Using Convolutional Neural Network" (IEICE Transactions A), Dec. 1, 2017, Vol. J100-A, No. 12, pp. 455-464

[NPL 2] SHEN Linlin, "Gabor Features and Support Vector Machine for Face Identification", Biomedical fuzzy and human sciences, the official journal of the Biomedical Fuzzy Systems Association 14(1), pp. 61-66, 2009 Jan. 8

SUMMARY

Technical Problem

In the related technology described in PTL 1, spoofing is identified by detecting a blink of a person. For that reason, when a moving image obtained by imaging the face of another person who blinks is displayed on a display, there is a possibility that a face image displayed on the display is erroneously identified as being authentic in the related technology described in PTL 1. Thus, it is not possible to prevent a malicious person from illegally passing the face authentication while holding the display on which the face image of another person is displayed in the hand as illustrated in FIG. 8.

In the related technology described in NPL 1, as the resolution of the face image displayed on the display increases, the accuracy of the discriminator decreases, and there is a high possibility that the face image is erroneously identified as the authentic face.

The present disclosure has been made in view of the above problems, and an object of the present disclosure is to provide an image processing apparatus and the like capable of accurately identifying spoofing using a face image.

Solution to Problem

An image processing apparatus according to an aspect of the present embodiments includes: a motion detection means for detecting, from time-series images, a feature relating to a motion of a head portion of a person and a feature relating to a motion of a body portion that is a region other than the head portion of the person; and an index value calculation means for calculating an index value indicating a degree of consistency between the feature relating to the motion of the head portion of the person and the feature relating to the motion of the body portion of the person.

An image processing method according to an aspect of the present embodiments includes: detecting, from time-series images, a feature relating to a motion of a head portion of a person and a feature relating to a motion of a body portion that is a region other than the head portion of the person; and calculating an index value indicating a degree of consistency between the feature relating to the motion of the head portion of the person and the feature relating to the motion of the body portion of the person.

A program according to an aspect of the present embodiments causes a computer to execute: detecting, from time-series images, a feature relating to a motion of a head portion of a person and a feature relating to a motion of a body portion that is a region other than the head portion of the person; and calculating an index value indicating a degree of consistency between the feature relating to the motion of the head portion of the person and the feature relating to the motion of the body portion of the person.

Advantageous Effects

According to an aspect of the present embodiments, spoofing using a face image can be accurately identified.

EXAMPLE EMBODIMENT

Figure 1:
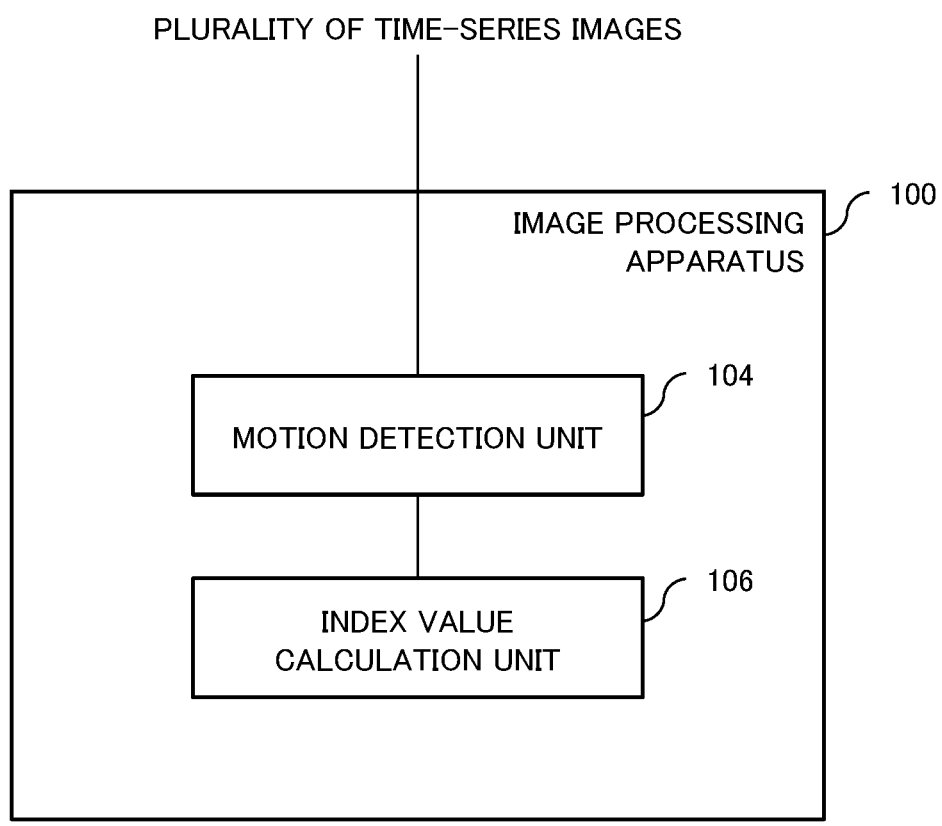
FIG. 1 is a block diagram illustrating a configuration of an image processing apparatus according to a first example embodiment.

The arrows drawn in the drawings referred to in the following description indicate a flow direction of a certain signal or data, and are not intended to exclude communication of the signal or data in both directions or in a direction opposite to the direction of the arrow.

First Example Embodiment (Image Processing Apparatus 100)

FIG. 1 is a block diagram illustrating a configuration of an image processing apparatus 100 according to a first example embodiment. As illustrated in FIG. 1, the image processing apparatus 100 includes a motion detection unit 104 and an index value calculation unit 106. The motion detection unit 104 is an example of a motion detection means. The index value calculation unit 106 is an example of an index value calculation means.

The motion detection unit 104 detects, from time-series images, features relating to a motion of a head portion of a person and features relating to a motion of a body portion that is a region other than the head portion of the person. For example, the motion detection unit 104 detects the features relating to the motion of the head portion of the person and the features relating to the motion of the body portion for each image from the time-series images by using a deep learning neural network.

Here, the head portion of the person is a region including the neck, face, head, and back of the head of the person. The body portion is at least a part of a region of the entire person excluding the head portion. Specifically, the body portion is the torso, arm, leg, or a combination thereof. The time-series images are, for example, data of a plurality of frame images of a moving image obtained by imaging the person by one or more imaging devices (not illustrated). Hereinafter, data of a frame image is also referred to as an image for convenience. The time-series images may be a plurality of still images obtained by repeatedly imaging the same person by an imaging device.

An example will be described of a configuration of the motion detection unit 104 described above. Upon acquiring the time-series images, the motion detection unit 104 analyzes those images to detect each of an area of the head portion and an area of the body portion of the person.

Then, the motion detection unit 104 detects first information indicating a change in a position of the head portion from images of the area of the head portion among the time-series images, and extracts the features relating to the motion of the head portion from the first information. The motion detection unit 104 detects second information indicating a change in a position of the body portion from images of the area of the body portion among the time-series images, and extracts the feature relating to the motion of the body portion from the second information. Hereinafter, features relating to motions are abbreviated as motion features.

The first information indicating the change in the position of the head portion is, for example, information indicating a change (displacement) in a position of a tracking point detected from the area of the head portion in the time-series images. The second information indicating the change in the position of the body portion is, for example, information indicating a change (displacement) in a position of a tracking point detected from the area of the body portion between the time-series images.

Motion features of the head portion include, for example, a motion vector indicating a direction in which the head portion moves. The motion detection unit 104 may calculate the change in the position of the head portion in a certain period of time on the basis of the first information, and may calculate a direction in which the head portion moves in the certain period of time. Alternatively, the motion features of the head portion may include a magnitude of a displacement of the head portion, or a period of the motion of the head portion. On the basis of the first information, the motion detection unit 104 may calculate, as the period of the motion of the head portion, an average time during which the position of the head portion changes from the uppermost vertex to the next uppermost vertex.

Information indicating the motion features of the head portion may be data regarding the motion vector indicating the direction in which the head portion moves, data representing the magnitude of the displacement of the head portion, or data representing the period of the motion of the head portion. For example, information of the motion vector regarding the motion of the head portion includes data regarding a motion vector of the tracking point in the area of the head portion. The data may include position coordinates before and after the tracking point is displaced, and data representing the direction and magnitude of the vector.

On the other hand, motion features of the body portion include, for example, a motion vector indicating a direction in which the body portion moves. Alternatively, the motion features of the body portion may include a magnitude of a displacement of the body portion or a period of the motion of the body portion. Information indicating the motion features of the body portion may be data regarding the motion vector indicating the direction in which the body portion moves, data representing the magnitude of the displacement of the body portion, or data representing the period of the motion of the body portion. For example, information of the motion vector regarding the motion of the body portion may include data regarding a motion vector of the tracking point in the area of the body portion. The data may include position coordinates before and after the tracking point is displaced, and data representing the direction and magnitude of the vector.

The motion detection unit 104 transmits the information indicating the motion features of the head portion and the information indicating the motion features of the body portion to the index value calculation unit 106.

The index value calculation unit 106 receives the information indicating the motion features of the head portion and the information indicating the motion features of the body portion from the motion detection unit 104. The index value calculation unit 106 calculates an index value indicating a degree of consistency between the motion of the head portion of the person and the motion of the body portion of the person on the basis of the information indicating the motion features of the head portion and the information indicating the motion features of the body portion.

The consistency mentioned here is not a concept including only that the motion of the head portion of the person and the motion of the body portion of the person completely match each other. A degree of similarity indicating closeness between the motion features of the head portion of the person and the motion features of the body portion of the person is also included in a category of the concept of consistency.

For example, the index value calculated by the index value calculation unit 106 is an output from the deep learning neural network having the motion vector indicating the direction in which the head portion moves and the motion vector indicating the direction in which the body portion moves as inputs. Alternatively, the index value is a distance between the motion vector indicating the direction in which the head portion moves and the motion vector indicating the direction in which the body portion moves. Alternatively, the index value may be an angle between the motion vector indicating the direction in which the head portion moves and the motion vector indicating the direction in which the body portion moves. A calculation method is not limited as long as the index value indicates the degree of consistency between the motion of the head portion of the person and the motion of the body portion of the person. A relationship between the index value calculated by the index value calculation unit 106 and spoofing by the person will be described below.

(Relationship Between Index Value and Spoofing)

As described above, the index value indicates the degree of consistency between the motion of the head portion of the person and the motion of the body portion of the person. Spoofing is an action of pretending that the person is another person. Here, a case will be described where the person performs spoofing another person by using a face image of the another person displayed on a print or display.

Figure 2:
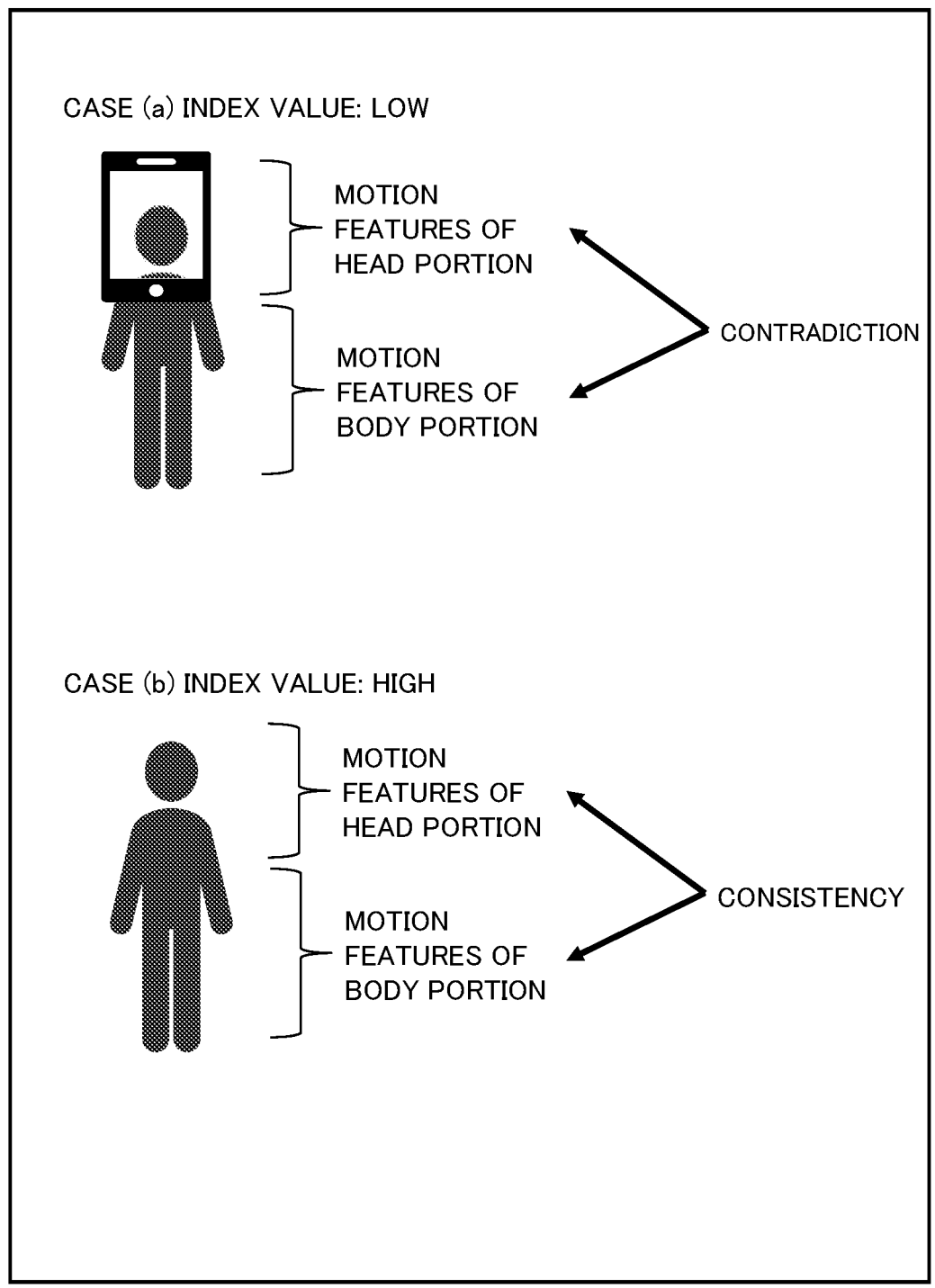
FIG. 2 is a diagram illustrating a relationship between a motion of a head/body portion of a person and spoofing.

A relationship between the index value and a spoofing action by the person will be described with reference to FIG. 2. FIG. 2 is a diagram illustrating a relationship between the index value and presence or absence of spoofing.

Figure 8:
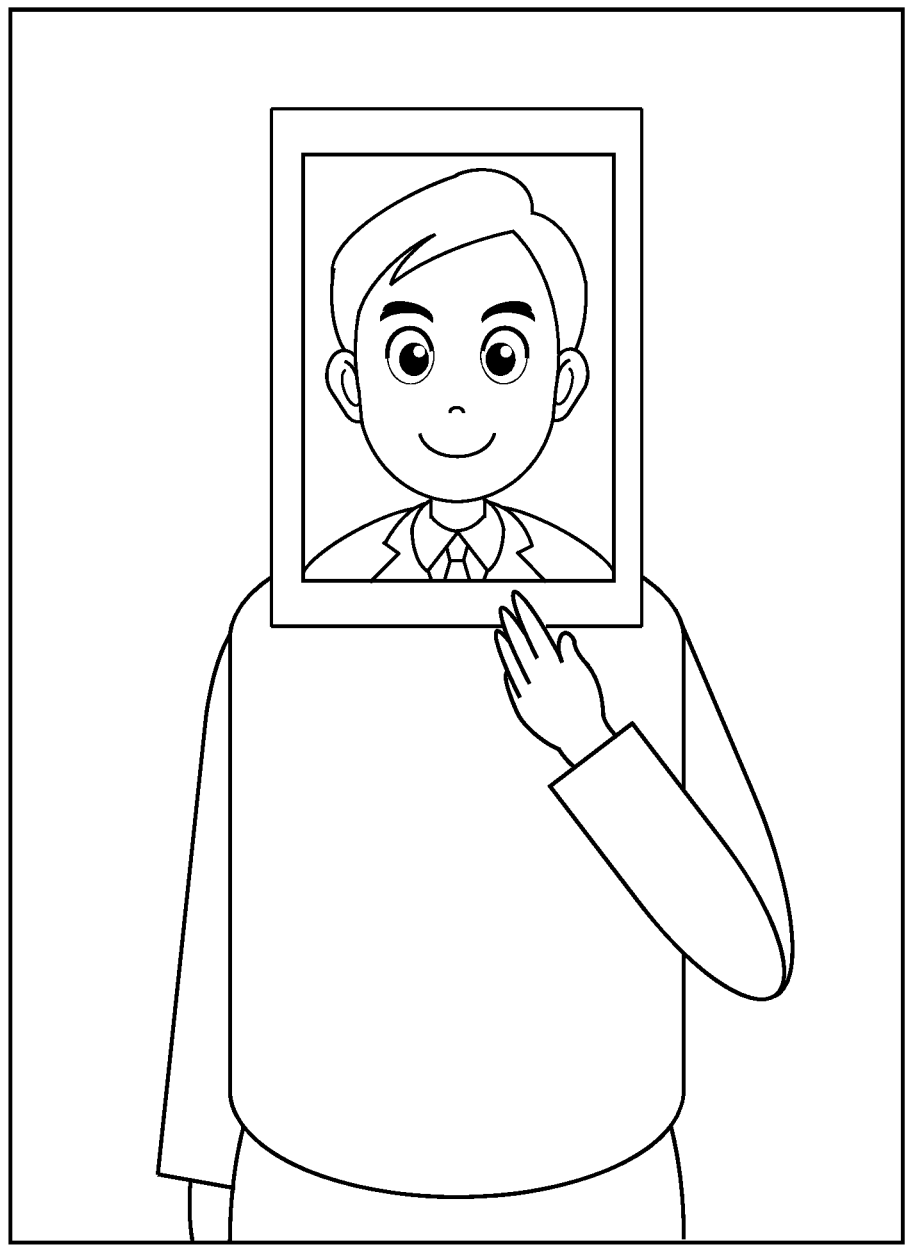
FIG. 8 is a diagram illustrating an example of a person who performs spoofing.

A case (a) in FIG. 2 illustrates a case where the index value is low. A low index value indicates that there is a contradiction between the motion features of the head portion and the motion features of the body portion. In the case (a), a person is performing spoofing by using a face image of another person. The person holds a display in the hand and raises the display in front of the face like the person illustrated in FIG. 8. For that reason, in the case (a), a contradiction may occur as a motion of one human, between the motion of the head portion and the motion of the body portion. More specifically, in walk-through authentication, when the person holding the display in the hand walks, a deviation unintended by the person occurs between the motion of the body portion and the motion of the arm (elbow) with respect to the period and magnitude of the motion, and the contradiction occurs as the motion of one human, between the motion of the head portion displayed on the display and the motion of the body portion of the person. Thus, the lower the index value, the higher the possibility that the person is performing spoofing.

In (b) of FIG. 2, a case is illustrated where the index value is high. A high index value indicates that the motion features of the head portion and the motion features of the body portion are consistent with each other. In the case (b), the person is not performing spoofing. For that reason, the direction in which the head portion of the person moves is synchronized with the direction in which the body portion moves, and there is almost no difference between the displacement of the head portion and the displacement of the body portion. That is, in the case (b), the motion of the head portion and the motion of the body portion match each other or are at least similar to each other. Thus, the lower the index value, the lower the possibility that a person is performing spoofing.

(Flow of Index Value Calculation Process)

Figure 3:
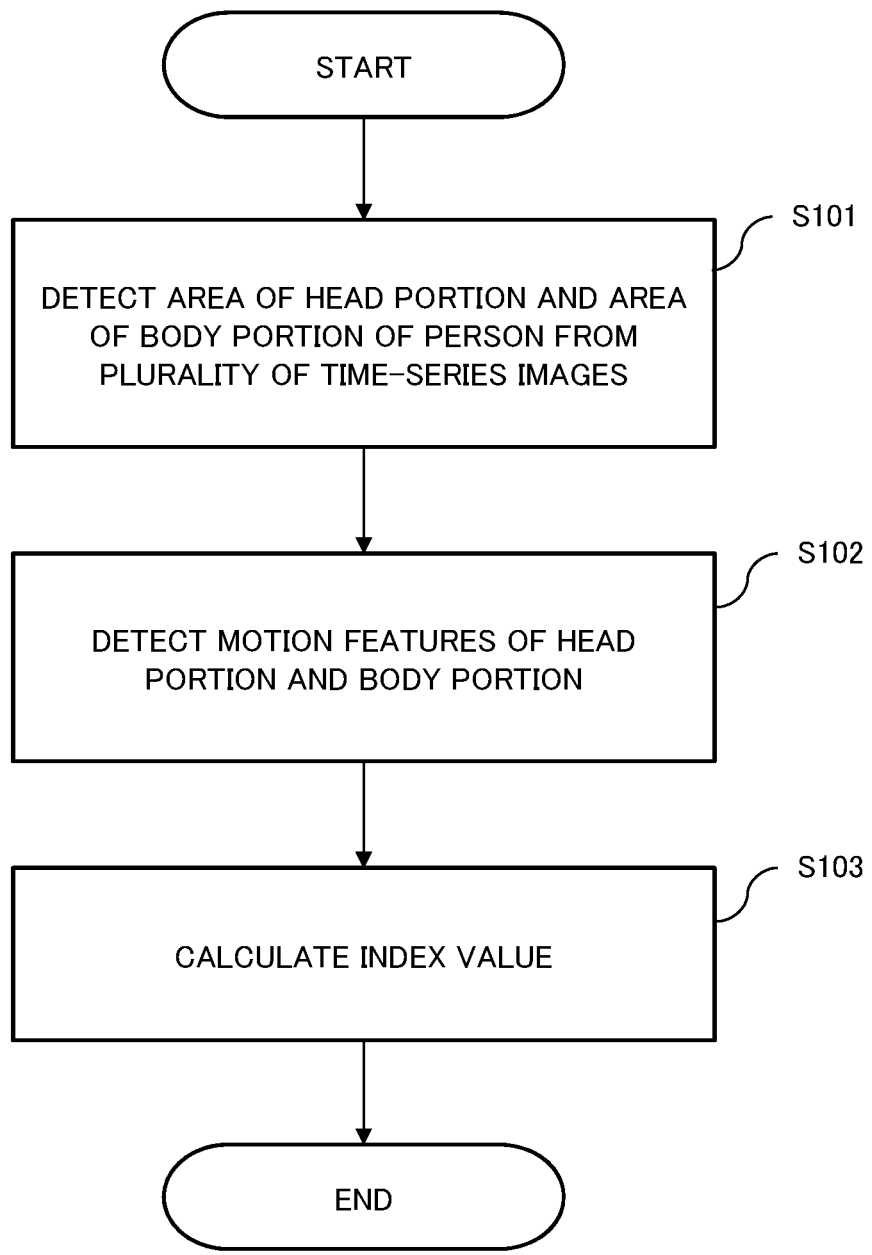
FIG. 3 is a flowchart illustrating a flow of a process for identifying spoofing according to the first example embodiment.

An index value calculation process executed by the image processing apparatus 100 according to the first example embodiment will be described with reference to FIG. 3. FIG. 3 is a flowchart illustrating a flow of the index value calculation process by the image processing apparatus 100.

As illustrated in FIG. 3, the motion detection unit 104 acquires time-series images. For example, the motion detection unit 104 acquires a moving image imaged by a monitoring camera (not illustrated), and extracts a plurality of images including a person from the moving image.

The motion detection unit 104 detects each of an area of the head portion of the person and an area of the body portion of the person from the time-series images acquired (S101).

The motion detection unit 104 analyzes the area of the head portion of the person and the area of the body portion of the person detected from the time-series images to detect features relating to the motion of the head portion of the person (motion features of the head portion) and features relating to the motion of the body portion (motion features of the body). (S102).

The motion detection unit 104 transmits the information indicating the motion features of the head portion and the information indicating the motion features of the body portion detected in step S102 to the index value calculation unit 106.

The index value calculation unit 106 receives the motion features of the head portion and the motion features of the body portion from the motion detection unit 104. Then, the index value calculation unit 106 calculates the index value described above from the motion features of the head portion and the motion features of the body portion received (S103).

Although not illustrated, after step S103, the index value calculation unit 106 may output the calculated index value to an external device (not illustrated) such as a display device. In addition, in the first example embodiment, the image processing apparatus 100 may determine spoofing using a face image from a magnitude of the index value and output an alert.

After the process described above, the index value calculation process executed by the image processing apparatus 100 according to the first example embodiment ends.

Effects of Present Example Embodiment

According to the configuration of the present example embodiment, the motion detection unit 104 detects the features relating to the motion of the head portion of the person and the features relating to the motion of the body portion that is the region other than the head portion of the person. The index value calculation unit 106 calculates the index value indicating the degree of consistency between the features relating to the motion of the head portion of the person and the features relating to the motion of the body portion. The index value represents a result of identifying spoofing.

When the face of the person is the face image displayed on the print or the display, a contradiction occurs between the motion of the head portion of the person and the motion of the region other than the head portion. For that reason, since the motion features of the head portion and the motion features of the body portion calculated by the motion detection unit 104 do not match each other, the index value calculated by the index value calculation unit 106 is low. That is, the index value is a parameter reflecting the possibility that the person is performing spoofing. According to the first example embodiment, spoofing using a face image can be accurately identified.

Second Example Embodiment

A second example embodiment includes a configuration that not only calculates an index value representing a result of identifying spoofing, but also determines whether a person is performing spoofing on the basis of the index value and outputs a determination result. A spoofing score described in the second example embodiment is an example of a parameter based on the index value.

(Image Processing Apparatus 200)

Figure 4:
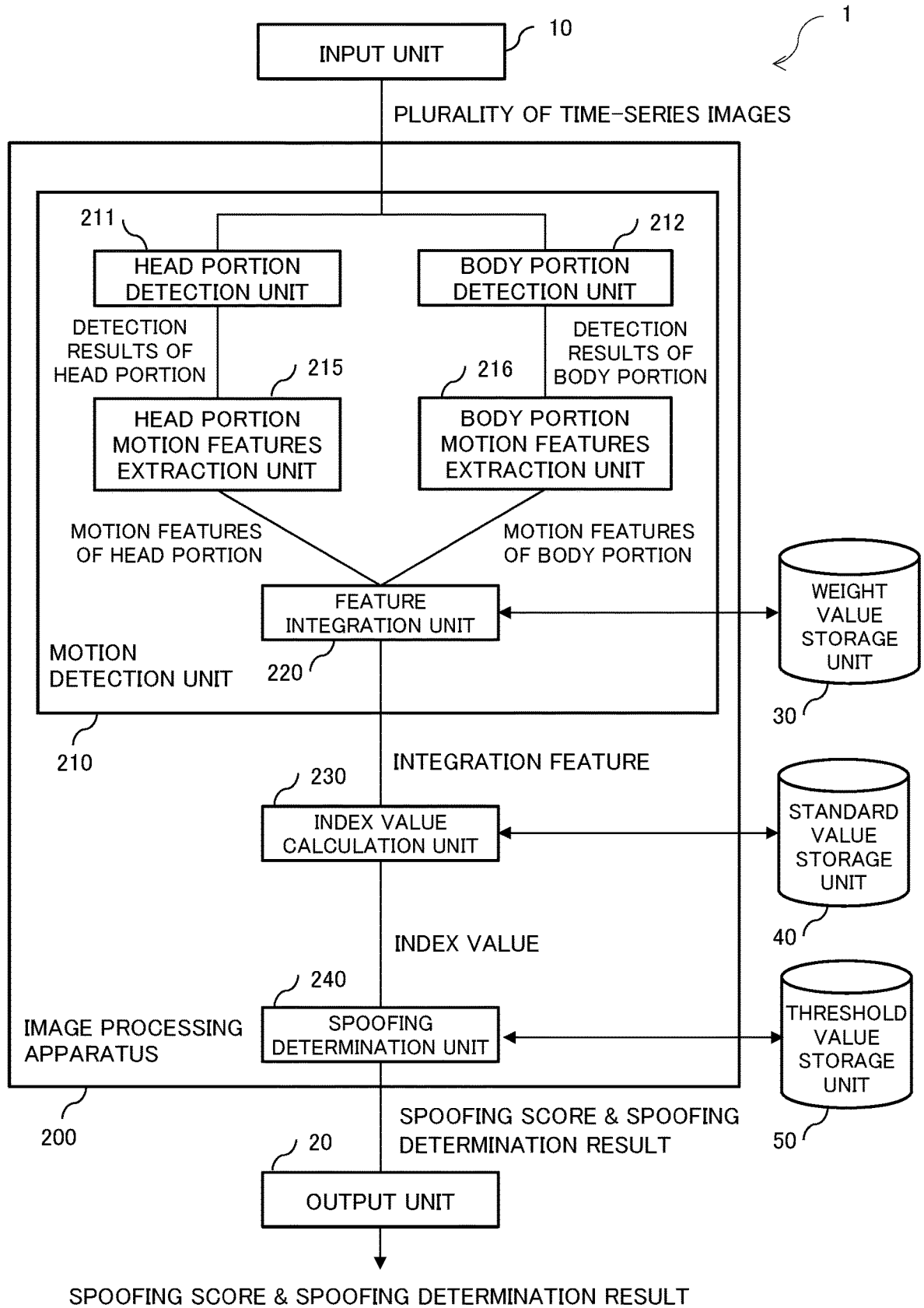
FIG. 4 is a block diagram illustrating a configuration of an image processing apparatus according to a second example embodiment.

A configuration of an image processing apparatus 200 according to the second example embodiment will be described with reference to FIG. 4. FIG. 4 is a block diagram illustrating a configuration of the image processing apparatus 200. As illustrated in FIG. 4, the image processing apparatus 200 includes a motion detection unit 210, an index value calculation unit 230, and a spoofing determination unit 240. The motion detection unit 210 is an example of a motion detection means. The index value calculation unit 230 is an example of an index value calculation means. The spoofing determination unit 240 is an example of a spoofing determination means.

The image processing apparatus 200 is connected to an input unit 10 and an output unit 20. The input unit 10 inputs time-series images to a head portion detection unit 211 and a body portion detection unit 212 included in the motion detection unit 210 of the image processing apparatus 200. The input unit 10 may include an imaging device that generates time-series images.

The output unit 20 receives a determination result (described as a spoofing determination result in FIG. 4) indicating whether a person is performing spoofing, and data of the spoofing score to be described later, from the spoofing determination unit 240 of the image processing apparatus 200. The output unit 20 outputs the spoofing score and spoofing determination result received to an external device such as a display device.

As illustrated in FIG. 4, the image processing apparatus 200, the input unit 10, the output unit 20, a weight value storage unit 30, a standard value storage unit 40, and a threshold value storage unit 50 constitute a spoofing detection device 1.

As illustrated in FIG. 4, the motion detection unit 210 includes the head portion detection unit 211, the body portion detection unit 212, a head portion motion features extraction unit 215, a body portion motion features extraction unit 216, and a feature integration unit 220.

The head portion detection unit 211 is an example of a head portion detection means. The body portion detection unit 212 is an example of a body portion detection means.

The head portion detection unit 211 detects an area corresponding to the head portion of the person in the time-series images. As described in the first example embodiment, the head portion of the person is a region including the neck, face, head, and back of the head of the person. The body portion detection unit 212 detects an area corresponding to the body portion of the person in the time-series images. The body portion is at least a part of a region of the entire person excluding the head portion.

For example, the head portion detection unit 211 detects the contour of the head portion of the person from each of the time-series images by pattern matching. For example, the body portion detection unit 212 detects a contour of the body portion of the person from each of the time-series images by pattern matching. In this case, the head portion detection unit 211 detects the contour of the head portion of the person from the time-series images by matching a sample image of the contour of the head portion collected in advance with the time-series images acquired from the input unit 10. Similarly, the body portion detection unit 212 detects the contour of the body portion of the person from the time-series images by a pattern matching method.

The head portion detection unit 211 detects a tracking point of the head portion of the person in the area of the head portion of the person detected. The tracking point of the head portion is, for example, a position of a part on the face such as the eyes, nose, or ears, or a position of the neck or top of the head. The body portion detection unit 212 detects a tracking point of the body portion of the person in the area of the body portion of the person detected by the body portion detection unit 212. The tracking point of the body portion is, for example, a position of a joint on the torso, arm, or leg. However, the tracking points of the head portion and the body portion are not limited to the examples described here.

Specifically, the head portion detection unit 211 detects the tracking point of the head portion of the person from each of the time-series images by using information for specifying the tracking point. The body portion detection unit 212 detects the tracking point of the body portion of the person from each of the time-series images by using information for specifying the tracking point.

The information for specifying the tracking point is, for example, a feature value of the tracking point. The feature value of the tracking point may be a Haar-like feature value related to a luminance difference between a pixel corresponding to the tracking point and its surrounding pixels. Alternatively, the information indicating the tracking point may be obtained by converting a luminance or hue of the pixel corresponding to the tracking point into vector data (numerical data string) by using a Gabor filter (NPL 2). The vector data is also referred to as a feature vector.

As another method for converting data of the time-series images into vector data, a scale-invariant feature transform (SIFT) method or a histograms of oriented gradients (HOG) method may be used. The head portion detection unit 211 and the body portion detection unit 212 may be designed to select an appropriate feature value conversion filter depending on a type of the images.

The head portion detection unit 211 transmits detection results of the tracking point of the head portion in the plurality of time-series images to the head portion motion features extraction unit 215 together with data of the plurality of time-series images. The body portion detection unit 212 transmits detection results of the tracking point of the body portion in the plurality of time-series images to the body portion motion features extraction unit 216 together with the data of the plurality of time-series images.

Alternatively, the head portion detection unit 211 may transmit detection results (for example, position information of the contour of the head portion) of the area of the head portion to the head portion motion features extraction unit 215 instead of the detection results of the tracking point of the head portion. The body portion detection unit 212 may transmit detection results (for example, position information of the contour of the body portion) of the area of the body portion to the body portion motion features extraction unit 216 instead of the detection results of the tracking point of the body portion.

The head portion motion features extraction unit 215 receives the detection results of the head portion of the person in the time-series images together with the data of the plurality of time-series images from the head portion detection unit 211. The body portion motion features extraction unit 216 receives the detection result of the body portion of the person in the time-series images together with the data of the plurality of time-series images from the body portion detection unit 212.

The head portion motion features extraction unit 215 extracts features relating to the motion of the head portion (motion features of the head portion) from the plurality of time-series images by using the detection results of the head portion of the person in the time-series images. The motion features of the head portion include the motion vector of the tracking point of the head portion of the person.

The body portion motion features extraction unit 216 extracts features relating to the motion of the body portion (motion features of the body portion) from the plurality of time-series images by using the detection results of the body portion of the person in the time-series images. The motion features of the body portion include the motion vector of the tracking point of the body portion of the person.

Specifically, the head portion motion features extraction unit 215 calculates a change in the position of the head portion in the time-series images on the basis of the detection results of the head portion of the person received from the head portion detection unit 211. For example, the head portion motion features extraction unit 215 detects the first information indicating the change in the position of the head portion from images of the area of the head portion among the time-series images. Then, the head portion motion features extraction unit 215 calculates the motion features of the head portion of the person from the calculated first information indicating the change in the position of the head portion. For example, the head portion motion features extraction unit 215 calculates information regarding a motion vector indicating the motion features of the head portion of the person from the first information.

The body portion motion features extraction unit 216 calculates a change in the position of the body portion in the time-series images on the basis of the detection results of the body portion of the person received from the body portion detection unit 212. For example, the body portion motion features extraction unit 216 detects the second information indicating the change in the position of the body portion from images of the area of the body portion among the time-series images. The body portion motion features extraction unit 216 calculates the motion features of the body portion of the person from the calculated second information indicating the change in the position of the body portion. For example, the body portion motion features extraction unit 216 calculates information regarding a motion vector indicating the motion features of the body portion of the person from the second information.

The head portion motion features extraction unit 215 transmits the information indicating the motion features of the head portion extracted from the time-series images to the feature integration unit 220. The body portion motion features extraction unit 216 transmits the information indicating the motion features of the body portion extracted from the time-series images to the feature integration unit 220.

The feature integration unit 220 receives the information indicating the motion features of the head portion and the information indicating the motion features of the body portion from the head portion motion features extraction unit 215 and the body portion motion features extraction unit 216, respectively. The feature integration unit 220 generates one integration feature by integration of the features relating to the motion of the head portion of the person and the features relating to the motion of the body portion. In other words, the feature integration unit 220 generates an integration feature relating to a combination of the motion of the head portion of the person and the motion of the body portion of the person from the motion features of the head portion and the motion features of the body portion. An example of the integration feature is described below.

(Example of integration feature)

For example, the integration feature is a vector obtained by connecting a motion vector of the head portion representing the motion features of the head portion and a motion vector of the head portion representing the motion features of the body portion. Alternatively, the integration feature is a weighted sum of the motion features of the head portion and the motion features of the body portion. In the latter case, the integration feature may be expressed as Expression (1) below. Here, an identifier of the tracking point of the head portion is represented by a symbol i (i is an integer of one or more), and an identifier of the tracking point of the body portion is represented by a symbol j (j is an integer of one or more).

[Expression 1]

$$F(i, j, x_i, y_j) = \sum_{i,j} (x_i \| if(i) + y_j g(j)) \quad (1)$$

In Expression (1), $F(i, j, x_i, y_j)$ is the integration feature, $f(i)$ is the motion features of the tracking point i of the head portion, and $g(j)$ is the motion features of the tracking point j of the body portion. The $x_i$ and $y_j$ are a weight value of the motion features of the head portion and a weight value of the motion features of the body portion, respectively. A method in which the feature integration unit 220 sets the weight values $x_i$ and $y_j$ will be described later.

The feature integration unit 220 calculates the integration feature F in accordance with Expression (1) using the motion features of the head portion and the motion features of the body portion. The feature integration unit 220 transmits information indicating the calculated integration feature F to the index value calculation unit 230.

The index value calculation unit 230 receives the information indicating the integration feature from the feature integration unit 220. The index value calculation unit 230 of the second example embodiment calculates the index value from the integration feature. Specifically, the index value calculation unit 230 inputs the integration feature to the deep learning neural network and obtains the index value as an output value.

Alternatively, the index value calculation unit 230 calculates a distance between the integration feature and a standard value. The standard value is a representative value of the integration feature obtained in accordance with Expression (1) from a combination of the motion features of the head portion and the motion features of the body portion of a person who is not performing spoofing. An example of the standard value will be described later.

For example, the distance between the integration feature and the standard value may be a Euclidean distance in a feature space, or may be a distance other than that. In the second example embodiment, the index value calculation unit 230 calculates the distance between the integration feature and the standard value as the index value. Similarly to the first example embodiment, the index value of the second example embodiment indicates the degree of consistency between the motion of the head portion of the person and the motion of the body portion of the person.

The index value calculation unit 230 transmits data of the index value calculated to the spoofing determination unit 240.

The spoofing determination unit 240 receives the data of the index value from the index value calculation unit 230. The spoofing determination unit 240 determines whether the person is performing spoofing in accordance with a spoofing determination criterion on the basis of the received index value. The spoofing determination criterion is a threshold value for comparison with the index value. A specific example of the spoofing determination criterion used by the spoofing determination unit 240 will be described later with reference to FIG. 5.

Further, the spoofing determination unit 240 calculates a "spoofing score" on the basis of the index value calculated by the index value calculation unit 230. The spoofing score is a parameter indicating a degree of possibility that the person is performing spoofing (see FIG. 2). For example, the spoofing score is a reciprocal of the index value. Alternatively, the spoofing score may be obtained by subtracting the index value from the maximum value of the index value. The maximum value of the index value is an index value when the motion of the head portion of the person and the motion of the body portion of the person completely match each other.

According to the above definition, as the index value is larger, the spoofing score is smaller, and the possibility that the person is performing spoofing is lower. On the other hand, as the index value is smaller, the spoofing score is larger, and the possibility that a person is performing spoofing is higher.

The spoofing determination unit 240 transmits information indicating a spoofing determination result and the data of the spoofing score to the output unit 20. The output unit 20 outputs the spoofing determination result and the spoofing score. An output destination may be a display device or a terminal of an operator monitoring illegality. Alternatively, the spoofing determination unit 240 may output only the spoofing determination result to the output unit 20.

(Weight Value)

The feature integration unit 220 needs to set in advance the weight values $x_i$, $y_j$ (i, j are the identifiers of the tracking points) of the motion features f(i), g (j) to generate the integration feature indicated in Expression (1).

The feature integration unit 220 first acquires a combination (hereinafter referred to as a group A) of the motion features of the head portion and the motion features of the body portion detected from a number of sample images of a person who is performing spoofing (the case (a) in FIG. 2), and a combination (hereinafter referred to as a group B) of the motion features of the head portion and the motion features of the body portion detected from a number of sample images of a person who is not performing spoofing (the case (b) in FIG. 2).

Alternatively, the feature integration unit 220 may generate these groups A and B from a combination of a number of motion features received from the head portion motion features extraction unit 215 and the body portion motion features extraction unit 216.

An integration feature when a combination of the motion features of the head portion and the motion features of the body portion belonging to the group A is substituted as f(i) and g(j) in Expression (1) described above is set as $F_A(x_i, y_j)$. An integration feature when a combination of the motion features of the head portion and the motion features of the body portion belonging to the group B is substituted as f(i) and g(j) in Expression (1) is set as $F_B(x_i, y_j)$.

The feature integration unit 220 sets the weight values $x_i$ and $y_j$ so that the integration feature $F_A(x_i, y_j)$ and the integration feature $F_B(x_i, y_j)$ can be distinguished. For example, the feature integration unit 220 sets the weight values $x_i$, $y_j$ so that an absolute value of a difference between the $F_B(x_i, y_j)$ and an $F_B(x_m, y_n)$ (m, n each are identifiers of tracking points different from i, j) is always equal to or less than a predetermined threshold value Th regardless of a combination of (i, j, m, n), and so that an absolute value of a difference between the $F_A(x_i, y_j)$ and the $F_B(x_i, y_j)$ always exceeds the predetermined threshold value Th regardless of a combination of (i, j). More specifically, the feature integration unit 220 only needs to, for example, comprehensively obtain values of the integration feature $F_A$, the integration feature $F_B$ while changing values of i, j, m, n, and obtain the weight values $x_i$, $y_j$ that satisfy conditions described above. In this case, it is assumed that the weight values $x_i$, $y_j$, $x_m$, $y_n$, can take some values of equal to or more than 0 and equal to or less than 1, for example, and the feature integration unit 220 only needs to perform comprehensive calculation described above while changing values to be substituted for the weight values $x_i$, $y_j$, $x_m$, $y_n$.

That is, the feature integration unit 220 sets the weight values $x_i$ and $y_j$ so that integration features of persons who are not performing spoofing are similar to each other while an integration feature of a person who is not performing spoofing is not similar to an integration feature of a person who is performing spoofing. The weight values $x_i$, $y_j$ may be different for each set (i, j) of the tracking point of the head portion and the tracking point of the body portion. Data of the threshold value Th is stored in advance in the threshold value storage unit 50 illustrated in FIG. 4.

Figure 5:
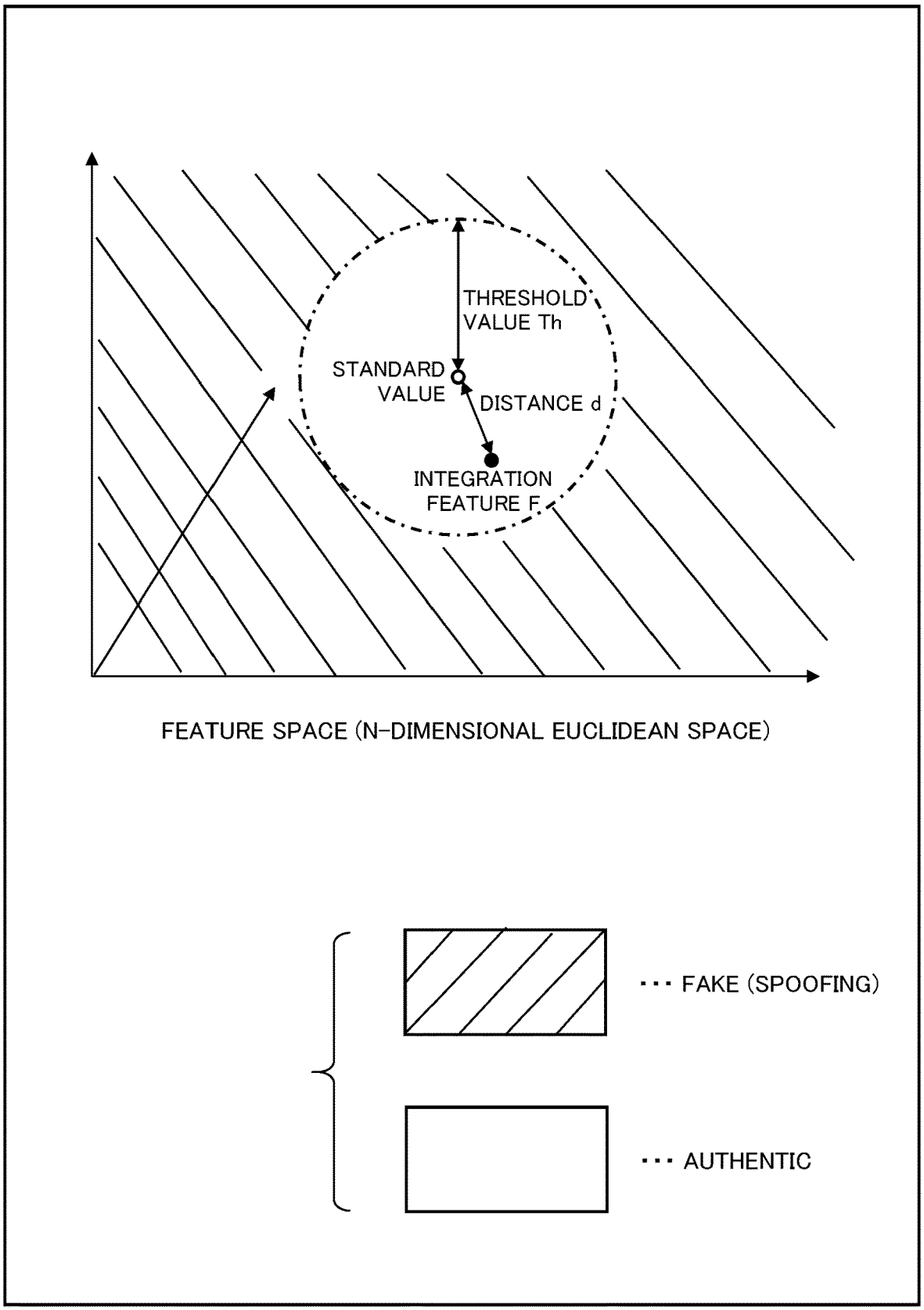
FIG. 5 is a diagram illustrating a standard value that is a spoofing determination criterion in the second example embodiment.

The feature integration unit 220 stores data of the set weight values $x_i$, $y_j$ in the weight value storage unit 30 illustrated in FIG. 5.

(Standard Value)

The index value calculation unit 230 according to the second example embodiment sets the standard value in advance to calculate the index value described above. As described above, the standard value is the representative value of the integration feature obtained in accordance with Expression (1) from the combination of the motion features of the head portion and the motion features of the body portion of the person who is not performing spoofing. For example, the standard value may be a statistical value such as an average of the integration feature $F_B(x_i, y_j)$ (i, j are the identifiers of the tracking points) obtained from a plurality of sample images of the person who is not performing spoofing.

The index value calculation unit 230 stores data of the set standard value in the standard value storage unit 40 illustrated in FIG. 5.

(Example of Spoofing Determination Criterion)

An example of a method in which the spoofing determination unit 240 determines spoofing will be described with reference to FIG. 5. FIG. 5 is a graph illustrating a feature space. The feature space is an N-dimensional (N>1) Euclidean space. FIG. 5 illustrates the N-dimensional (N>1) Euclidean space in three dimensions. Axes of the feature space respectively correspond to feature values different from each other included in the integration feature.

In the graph illustrated in FIG. 5, a standard value is indicated. As described above, the standard value is a statistical level value of the integration feature obtained from the plurality of sample images of the person who is not performing spoofing. With the standard value as the center, mesh is applied to the outer side of a range up to a certain distance (threshold value Th). A distance from the standard value to the integration feature F is represented by d. In FIG. 5, d<Th. That is, in the integration feature F, the integration feature is within the range up to the certain distance (threshold value Th) with the standard value as the center.

In the feature space illustrated in FIG. 5, if the integration feature F is within the range up to the certain distance (threshold value Th) with the standard value as the center, the spoofing determination unit 240 determines that the person is authentic (that is, the person is not performing spoofing). On the other hand, if the integration feature is out of the range up to the certain distance (threshold value Th) with the standard value as the center, the spoofing determination unit 240 determines that a person is performing spoofing.

Regarding FIG. 5, the closer the integration feature F is to the standard value, the lower the possibility that the person is spoofing another person. Conversely, as the integration feature F deviates from the standard value, there is a higher possibility that the person is spoofing another person. Thus, when the distance d (corresponding to the index value) between the integration feature and the standard value is equal to or less than the threshold value Th, the spoofing determination unit 240 determines that the person is not performing spoofing. On the other hand, when the distance d between the integration feature and the standard value exceeds the threshold value Th, the spoofing determination unit 240 determines that the person is performing spoofing.

(Operation of Image Processing Apparatus 200)

Figure 6:
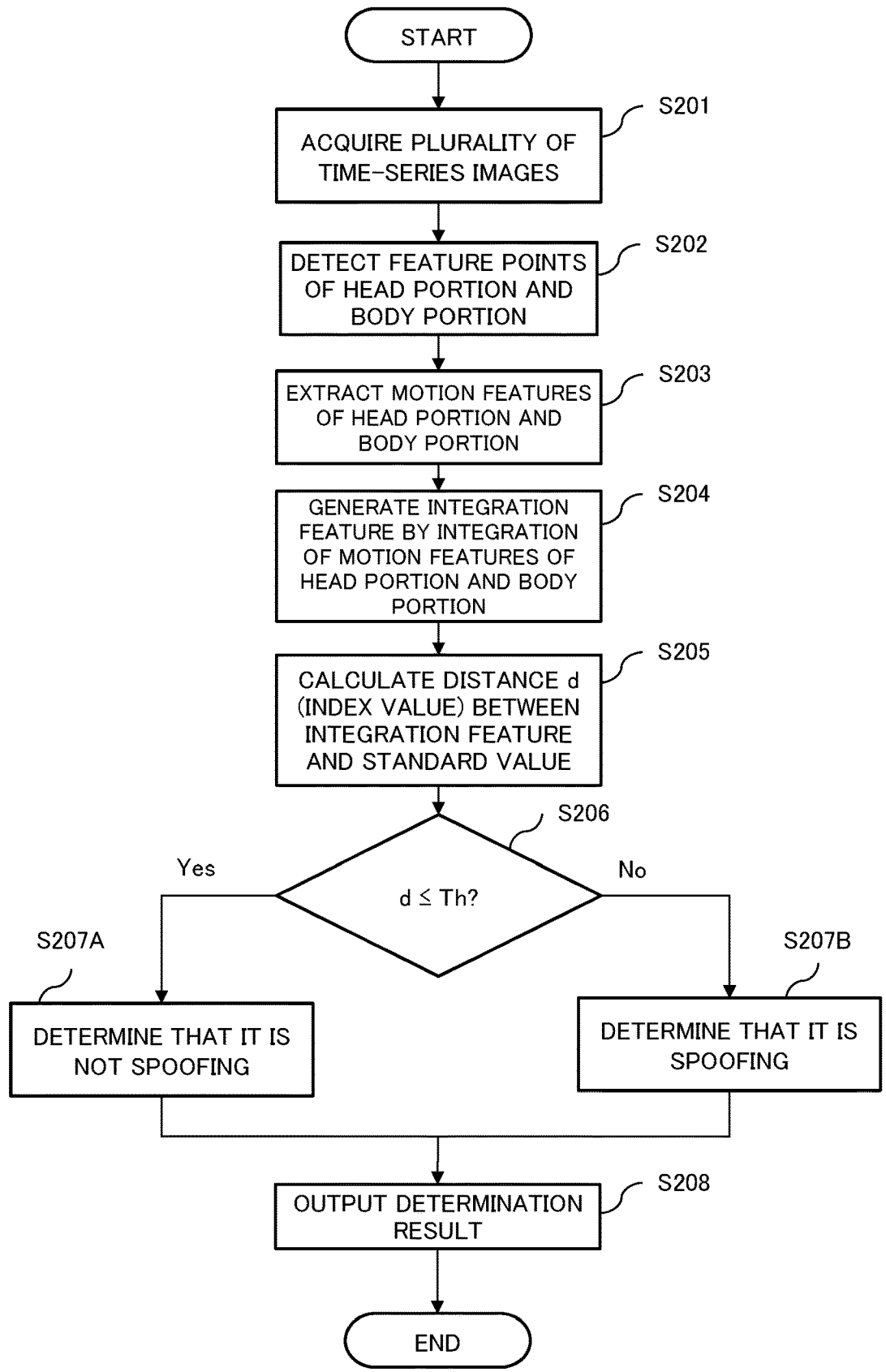
FIG. 6 is a flowchart illustrating a flow from acquisition of an image to a spoofing determination process in the image processing apparatus according to the second example embodiment.

Operation executed by the image processing apparatus 200 according to the second example embodiment will be described with reference to FIG. 6. FIG. 6 is a flowchart illustrating a flow of a process from acquisition of an image by the image processing apparatus 200 to spoofing determination.

As illustrated in FIG. 6, each of the head portion detection unit 211 and the body portion detection unit 212 acquires a plurality of time-series images from the input unit 10 (S201).

For example, the head portion detection unit 211 and the body portion detection unit 212 acquire data of frame images of a moving image imaged within a predetermined period (for example, 10 seconds) by one camera.

The head portion detection unit 211 detects the head portion of the person from each of the time-series images acquired. The body portion detection unit 212 detects the body portion of the person from each of the same time-series images acquired (S202).

In step S202, the head portion detection unit 211 may first extract an area of the head portion of the person from each image by pattern matching or the like, and then detect a tracking point of the head portion from the extracted area of the head portion of the person. Similarly, the body portion detection unit 212 may first extract an area of the body portion of the person from each image by pattern matching or the like, and then detect a tracking point of the body portion from the extracted area of the body portion of the person.

The head portion detection unit 211 transmits a detection result of the head portion of the person together with data of the time-series images to the head portion motion features extraction unit 215. The body portion detection unit 212 transmits a detection result of the body portion of the person to the body portion motion features extraction unit 216 together with the data of the time-series images.

The head portion motion features extraction unit 215 receives the detection result of the head portion of the person together with the data of the time-series images from the head portion detection unit 211. The body portion motion features extraction unit 216 receives the detection result of the body portion of the person together with the data of the time-series images from the body portion detection unit 212.

The head portion motion features extraction unit 215 extracts the motion features of the head portion of the person from the time-series images. The body portion motion features extraction unit 216 extracts the motion features of the body portion of the person from the time-series images (S203).

The head portion motion features extraction unit 215 transmits information indicating the motion features of the head portion detected to the feature integration unit 220. The body portion motion features extraction unit 216 transmits information indicating the motion features of the body portion detected to the feature integration unit 220.

The feature integration unit 220 receives information indicating the motion features of the head portion and information indicating the motion features of the body portion from the head portion motion features extraction unit 215 and the body portion motion features extraction unit 216, respectively.

The feature integration unit 220 generates an integration feature by integration of the motion features of the head portion and the motion features of the body portion (S204).

Specifically, using the weight values $x_i$ and $y_j$ (i, j are the identifiers of the tracking points of the head, body, respectively) stored in advance in the weight value storage unit 30 (see FIG. 4), the feature integration unit 220 generates the integration feature $F(i, j, x_i, y_j)$ associated to the weight values $x_i$ and $y_j$, the motion features f(i) of the head portion, and the motion features g(j) of the body portion, in accordance with Expression (1) described above. The feature integration unit 220 transmits the information indicating the integration feature generated to the index value calculation unit 230.

The index value calculation unit 230 receives the information indicating the integration feature from the feature integration unit 220. The index value calculation unit 230 acquires the standard value stored in advance in the standard value storage unit 40 (see FIG. 5), and calculates, as the index value, the distance d (see FIG. 5) between the integration feature and the standard value in the feature space (S205).

Alternatively, in step S205, the index value calculation unit 230 may calculate an index value based on the distance d. For example, the index value calculation unit 230 calculates a value of a function depending on the distance d as the index value. The index value calculation unit 230 transmits data of the index value calculated to the spoofing determination unit 240.

The spoofing determination unit 240 receives the data of the index value from the index value calculation unit 230. The spoofing determination unit 240 refers to the threshold value storage unit 50 to acquire the threshold value Th. The spoofing determination unit 240 determines whether the index value is equal to or less than the threshold value Th (see FIG. 5) (S206).

After step S206, the spoofing determination unit 240 determines presence or absence of spoofing as follows.

When the distance d (corresponding to the index value) between the integration feature and the standard value is equal to or less than the threshold value Th (Yes in S206), the spoofing determination unit 240 determines that the person is not performing spoofing (S207A).

On the other hand, when the distance d between the integration feature and the standard value exceeds the threshold value Th (No in S206), the spoofing determination unit 240 determines that the person is performing spoofing (S207B).

Thereafter, the spoofing determination unit 240 outputs a spoofing determination result in step S207A or S207B, and data of the spoofing score (S208).

An output destination may be a display device or a terminal of an operator. In step S208, the spoofing determination unit 240 may output the index value calculated by the index value calculation unit 230 together with the spoofing determination result and the data of the spoofing score.

After the process described above, the spoofing determination process executed by the image processing apparatus 200 according to the second example embodiment ends.

Effects of Present Example Embodiment

According to the configuration of the present example embodiment, the motion detection unit 210 detects, from the time-series images, the feature relating to the motion of the head portion of the person and the feature relating to the motion of the body portion that is a region other than the head portion of the person. The index value calculation unit 230 calculates the index value indicating the degree of consistency between the feature relating to the motion of the head portion of the person and the feature relating to the motion of the body portion.

When the person is performing spoofing using the face image displayed on the print or display, a contradiction occurs between the feature relating to the motion of the head portion of the person and the feature relating to the motion of the body portion, and the consistency is lost. In the second example embodiment, spoofing can be accurately identified from the index value indicating the degree of consistency between the feature relating to the motion of the head portion of the person and the feature relating to the motion of the body portion.

The spoofing determination unit 240 determines whether the person is spoofing another person on the basis of the index value. The index value indicates the degree of consistency between the motion of the head portion of the person and the motion of the body portion of the person. For that reason, the spoofing determination unit 240 can determine with high accuracy whether the person is spoofing another person.

Further, the index value calculation unit 230 calculates the index value on the basis of the integration feature generated by the feature integration unit 220 and the standard value set in advance. The integration feature may be a weighted sum of the feature relating to the motion of the head portion of the person and the feature relating to the motion of the body portion of the person. Since the standard value is the representative value of the integration feature obtained from the combination of the motion features of the head portion and the motion features of the body portion of the person who is not performing spoofing, the closer the integration feature is to the standard value, the higher the possibility that the person is not performing spoofing. By using the integration feature and the standard value, it is possible to calculate the index value indicating with high accuracy the degree of consistency between the feature relating to the motion of the head portion of the person and the feature relating to the motion of the body portion.

Third Example Embodiment

A third example embodiment will be described below with reference to FIG. 7.

(Regarding Hardware Configuration)

Components of the image processing apparatuses 100, 200 described in the first and second example embodiments each indicate a block of a functional unit. Some or all of these components are implemented by an information processing apparatus 900 as illustrated in FIG. 7, for example. FIG. 7 is a block diagram illustrating an example of a hardware configuration of the information processing apparatus 900.

Figure 7:
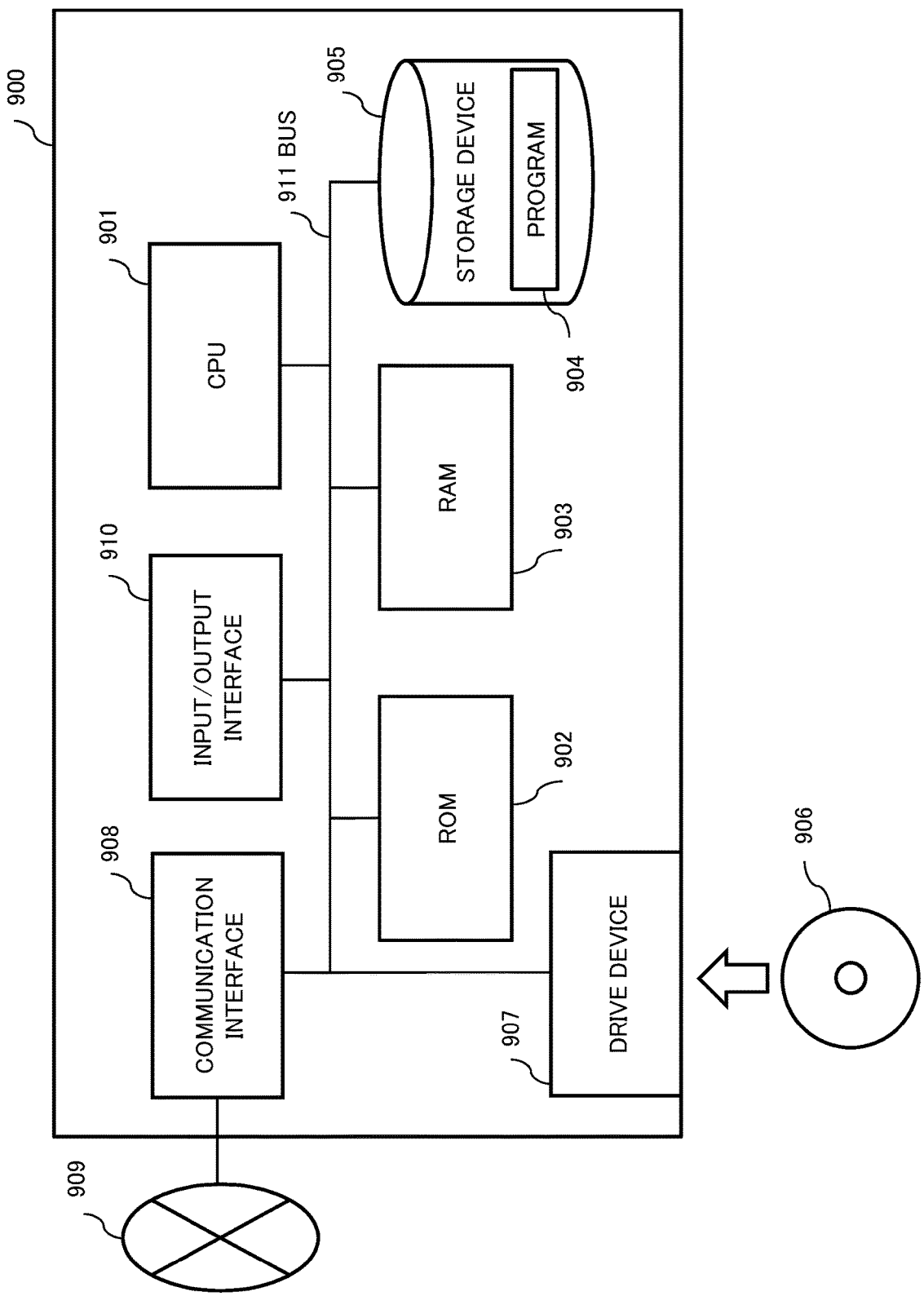
FIG. 7 is a diagram illustrating a hardware configuration of an apparatus according to a third example embodiment.

As illustrated in FIG. 7, the information processing apparatus 900 includes the following configuration as an example.

Central Processing Unit (CPU) 901
Read Only Memory (ROM) 902
Random Access Memory (RAM) 903
Program 904 loaded into RAM 903
Storage device 905 storing program 904
Drive device 907 performing read/write from/to recording medium 906
Communication interface 908 for connecting to communication network 909
Input/output interface 910 for inputting/outputting data
Bus 911 for connecting each component The components of the image processing apparatuses 100, 200 described in the first and second example embodiments are implemented by the CPU 901 reading and executing the program 904 that implements functions of these components. The program 904 that implements the functions of the components is stored in the storage device 905 or the ROM 902 in advance, for example, and the CPU 901 loads the program into the RAM 903 and executes the program as necessary. The program 904 may be supplied to the CPU 901 via the communication network 909, or may be stored in the recording medium 906 in advance, and the drive device 907 may read the program and supply the program to the CPU 901.

Effects of Present Example Embodiment

According to the configuration of the present example embodiment, the image processing apparatus described in the above example embodiment is implemented as hardware. Thus, effects similar to the effects described in the above example embodiment can be obtained.

In the above, the present embodiments have been described with reference to the example embodiments; however, the present embodiments are not limited to the above-described example embodiments. Various modifications that can be understood by those skilled in the art can be made to the configuration and details of the present embodiments within the scope of the present disclosure.

This application is based upon and claims the benefit of priority from Japanese patent application No. 2019-055164, filed on Mar. 22, 2019, the disclosure of which is incorporated herein in its entirety by reference.

REFERENCE SIGNS LIST

100 Image processing apparatus
104 Motion detection unit
106 Index value calculation unit
200 Image processing apparatus
210 Motion detection unit
211 Head portion detection unit
212 Body portion detection unit
215 Head portion motion features extraction unit
216 Body portion motion features extraction unit
220 Feature integration unit
230 Index value calculation unit
240 Spoofing determination unit

What is claimed is:

1. An image processing device comprising:
a memory storing a computer program; and
at least one processor configured to run the computer program to perform:
detecting, from time-series images, a first feature relating to a first motion of a head portion of a person and a second feature relating to a second motion of a body portion that is a region other than the head portion of the person;
calculating, as one integration feature, a weighted sum of the first feature relating to the first motion of the head portion of the person and the second feature relating to the second motion of the body portion of the person;
calculating, from the one integration feature, an index value indicating a degree of consistency between the first feature relating to the first motion of the head portion of the person and the second feature relating to the second motion of the body portion of the person; and
determining whether the person is spoofing another person, based on the index value, such that spoofing is detected based on a mismatch between the head portion and the body portion of the person.

2. The image processing device according to claim 1, wherein
the index value is any one of:
a distance between a first motion vector indicating a direction in which the head portion of the person moves and a second motion vector indicating a direction in which the body portion of the person moves;
an angle between the first motion vector indicating the direction in which the head portion of the person moves and the second motion vector indicating the direction in which the body portion of the person moves; or
an output value of a function including a deep learning neural network, the function having the first motion vector indicating the direction in which the head portion of the person moves and the second motion vector indicating the direction in which the body portion of the person moves as inputs.

3. The image processing device according to claim 1, wherein
the at least one processor is configured to run the computer program to perform:
detecting the head portion of the person from the time-series images;
detecting the region other than the head portion of the person from the time-series images;
extracting the first feature relating to the first motion of the head portion of the person from a detection result of the head portion of the person in the time-series images; and
extracting the second feature relating to the second motion of the body portion of the person from the detection result of the region other than the head portion of the person in the time-series images.

4. The image processing device according to claim 1, wherein
the first feature relating to the first motion of the head portion of the person includes a first motion vector of the head portion of the person, and
the second feature relating to the second motion of the body portion of the person includes a second motion vector of the body portion of the person.

5. The image processing device according to claim 1, wherein
the at least one processor is configured to run the computer program to perform:
detecting the first feature relating to the first motion of the head portion of the person and the second feature relating to the motion of the region other than the head portion of the person from the time-series images by using a neural network.

6. An image processing method comprising:
detecting, by a processor and from time-series images, a first feature relating to a first motion of a head portion of a person and a second feature relating to a second motion of a body portion that is a region other than the head portion of the person;
calculating, by the processor and as one integration feature, a weighted sum of the first feature relating to the first motion of the head portion of the person and the second feature relating to the second motion of the body portion of the person;
calculating, by the processor and from the one integration feature, an index value indicating a degree of consistency between the first feature relating to the first motion of the head portion of the person and the second feature relating to the second motion of the body portion of the person; and
determining, by the processor, whether the person is spoofing another person, based on the index value, such that spoofing is detected based on a mismatch between the head portion and the body portion of the person.

7. A non-transitory recording medium storing a program executable by a computer to perform:
detecting, from time-series images, a first feature relating to a first motion of a head portion of a person and a second feature relating to a second motion of a body portion that is a region other than the head portion of the person;
calculating, as one integration feature, a weighted sum of the first feature relating to the first motion of the head portion of the person and the second feature relating to the second motion of the body portion of the person;

calculating, from the one integration feature, an index value indicating a degree of consistency between the first feature relating to the first motion of the head portion of the person and the second feature relating to the second motion of the body portion of the person; and determining whether the person is spoofing another person, based on the index value, such that spoofing is detected based on a mismatch between the head portion and the body portion of the person.

8. The image processing device according to claim 1, wherein the index value when the first feature relating to the first motion of the head portion of the person and the second feature relating to the second motion of the body portion of the person does not match is lower than the index value when the first feature and the second feature match, and the at least one processor is configured to run the computer program to perform: determining that the lower the index value is, the higher a possibility that the person is spoofing.

\* \* \* \* \*